US008872449B2

United States Patent
Tojo et al.

(10) Patent No.: US 8,872,449 B2
(45) Date of Patent: Oct. 28, 2014

(54) DISTRIBUTED-ARRANGEMENT LINEAR MOTOR AND CONTROL METHOD OF DISTRIBUTED-ARRANGEMENT LINEAR MOTOR

(75) Inventors: Toshiro Tojo, Shinagawa-ku (JP); Toshiyuki Aso, Shinagawa-ku (JP); Yuki Nomura, Shinagawa-ku (JP); Akihiro Unno, Shinagawa-ku (JP)

(73) Assignee: THK Co., Ltd., Tokyo (JP)

( * ) Notice: Subject to any disclaimer, the term of this patent is extended or adjusted under 35 U.S.C. 154(b) by 86 days.

(21) Appl. No.: 13/390,212

(22) PCT Filed: Aug. 5, 2010

(86) PCT No.: PCT/JP2010/063289
§ 371 (c)(1),
(2), (4) Date: Feb. 13, 2012

(87) PCT Pub. No.: WO2011/024624
PCT Pub. Date: Mar. 3, 2011

(65) Prior Publication Data
US 2012/0139455 A1 Jun. 7, 2012

(30) Foreign Application Priority Data
Aug. 28, 2009 (JP) .................................. 2009-198653

(51) Int. Cl.
| | |
|---|---|
| *H02K 41/00* | (2006.01) |
| *H02P 6/00* | (2006.01) |
| *H02K 41/03* | (2006.01) |
| *H02P 25/06* | (2006.01) |
| *H02K 11/00* | (2006.01) |

(52) U.S. Cl.
CPC ............ *H02K 41/03* (2013.01); *H02K 11/0021* (2013.01); *H02P 6/006* (2013.01); *H02P 25/06* (2013.01); *H02K 2213/09* (2013.01)
USPC . 318/135; 318/687; 318/400.16; 318/400.17; 318/400.26

(58) Field of Classification Search
USPC .............. 318/687, 135, 115, 400.16, 400.17, 318/400.26
See application file for complete search history.

(56) References Cited

U.S. PATENT DOCUMENTS

RE39,747 E * 7/2007 Peltier et al. ............... 310/12.11

FOREIGN PATENT DOCUMENTS

| JP | 2000-245128 A | 9/2000 |
|---|---|---|
| JP | 2004-080881 A | 9/2000 |
| JP | 2000245128 * | 9/2000 |
| JP | 2000-278931 A | 10/2000 |
| JP | 2004-056892 A | 2/2004 |

* cited by examiner

*Primary Examiner* — Eduardo Colon Santana
*Assistant Examiner* — Iftekhar Mustafa
(74) *Attorney, Agent, or Firm* — Sughrue Mion, PLLC

(57) ABSTRACT

A distributed-arrangement linear motor in which stators are arranged in a distributed manner and a method of controlling the distributed-arrangement linear motor are provided. The linear motor 1 is a linear motor in which a stator and a movable member are relatively movable, wherein the stator and the movable member respectively have periodic structures in which plural kinds of poles of the stator and the movable member (12a, 12b, 12c) (22a, 22b, 22c) which magnetically act each other and arranged periodically subsequently in an order according to the arrangement in a direction of the relative motion therebetween; a plurality of stators are arranged in a distributed manner in the direction of the relative motion; a distance D1, D2 between adjacent stators is not more than a length Lmv of the movable member; the pole of the stator is formed of a coil 11; and a current control unit that controls current to be supplied to the coil based on the distance between the stators is provided.

4 Claims, 11 Drawing Sheets

DISTRIBUTED-ARRANGEMENT LINEAR MOTOR AND CONTROL METHOD OF DISTRIBUTED-ARRANGEMENT LINEAR MOTOR

CROSS REFERENCE TO RELATED APPLICATIONS

This application is a National Stage of International Application No. PCT/JP2010/063289 filed Aug. 5, 2010, claiming priority based on Japanese Patent Application No. 2009-198653, filed Aug. 28, 2009, the contents of all of which are incorporated herein by reference in their entirety.

TECHNICAL FIELD

The present invention relates to a linear motor utilized for driving a bogie of a conveying apparatus, and more particularly, to a linear motor having stators arranged in a distributed manner, which may be called "distributed-arrangement linear motor" hereinlater for the sake of convenience, and also relates to a method of controlling such linear motor including the distributed-arrangement stators.

BACKGROUND ART

In general, a linear motor utilized for conveying parts or works has a structure in which a movable member moves on one stator. However, an adoption of a structure having a long conveying path results in increasing in facility cost, thus being defective, and in order to avoid such defect, there has been proposed a method of arranging stators in a distributed or separated manner. In such stator distributed arrangement (non-continuous arrangement), for example, Patent Document 1 discloses a linear motor speed-change reduction method, without causing uneven speed even in adoption of a ground primary-side distributed arrangement system which is driven in an open-loop manner, by considering a relationship between a position of a secondary-side bogie and acceleration.

PRIOR ART DOCUMENT

Patent Document

Patent Document 1: Japanese Patent Application Laid-open Publication No. 2004-80881

DISCLOSURE OF THE INVENTION

Problem to be Solved by the Invention

Incidentally, in stators arranged separately in a distributed manner, it is necessary to consider mutual relationships between a plurality of stators and a plurality of movable members different from a structure in which one movable member on one stator is controlled, and hence, many kinds of controlling methods or manners may be adopted.

However, the technology disclosed in the Patent Document 1 concerns a linear motor speed-change reduction method for avoiding unevenness in speed at a driving time at which acceleration mainly changes. Specifically, the disclosed method is a control method in a case in which the movable member is once separated from the stator and is then moved to the next stator.

Because of such structure, it may be not said that the disclosed linear motor is made by sufficiently considering the distributed arrangement of the stators in a structure in which the movable member straddles the adjacent stators.

The present invention was conceived to solve such defects and an object thereof is to provide a distributed arrangement linear motor suitable for stators arranged in a distributed manner and also provide a control method of such distributed arrangement linear motor.

Means for Solving the Problems

In order to achieve the above object, according to an aspect of an exemplary embodiment, there is a distributed-arrangement linear motor in which a stator and a movable member are arranged to be relatively movable, wherein the stator and the movable member respectively have periodic structures in which plural kinds of poles of the stator and the movable member which magnetically act each other and arranged periodically subsequently in an order according to the arrangement in a direction of the relative motion therebetween; a plurality of stators are arranged in a distributed manner in the direction of the relative motion; a distance between adjacent stators is not more than a length of the movable member; the pole of the stator or the pole of the movable member is formed of a coil; and a current control unit that controls current to be supplied to the coil based on the distance between the stators is further provided.

According to another exemplary embodiment, in the distributed-arrangement linear motor, the current control unit is configured to calculate a phase of the current to be supplied to the coil based on the distance between the stators.

According to another exemplary embodiment, in the distributed-arrangement linear motor, the distance between the stators is a minimum distance between the poles of the adjacent stators, and the length of the movable member is a maximum distance between the poles of the movable member.

According to another exemplary embodiment, in the distributed-arrangement linear motor, either one of the poles of the stator and the movable member is composed of a permanent magnet for driving, and a position detector that detects a position of the permanent magnet for driving and calculates a position thereof is further provided for the stator or movable member on the coil side.

According to another exemplary embodiment, in the distributed-arrangement linear motor, a distance calculating unit that calculates the distance between the stators based on information from the position detector is further provided.

According to another exemplary embodiment, there is a method of controlling a distributed-arrangement linear motor including a stator and a movable member arranged to be relatively movable, in which the stator and the movable member respectively have periodic structures in which plural kinds of poles of the stator and the movable member which magnetically act each other and arranged periodically subsequently in an order according to the arrangement in a direction of the relative motion therebetween, a plurality of stators are arranged in a distributed manner in the direction of the relative motion, a distance between adjacent stators is not more than the length of the movable member, and the pole of the stator or the pole of the movable member is formed of a coil, wherein a current to be supplied to the coil is controlled based on the distance between the stators.

Effects of the Invention

The present invention provides a linear motor in which a stator and a movable member are arranged to be relatively movable, wherein the stator and the movable member respectively have periodic structures in which plural kinds of poles of the stator and the movable member which magnetically act each other and arranged periodically subsequently in an order according to the arrangement in a direction of the relative motion therebetween; a plurality of stators are arranged in a distributed manner in the direction of the relative motion; a distance between adjacent stators is not more than a length of the movable member; the pole of the stator or the pole of the movable member is formed of a coil; and a current control unit that controls current to be supplied to the coil based on the distance between the stators is further provided. According to the above structure of the linear motor, when the movable member moves from one stator to the adjacent next stator, the current to be supplied to the coil is controlled by the current control unit so as not to cause any loss of thrust force of the movable member to thereby control the speed thereof. Thus, the present invention provides the distributed-arrangement linear motor and the control method of such linear motor which can attain the above mentioned effects.

MODES FOR CARRYING OUT THE INVENTION

A best mode for embodying the present invention will be explained hereunder with reference to the accompanying drawings.

First Embodiment

Schematic structure and function of a drive system of a distributed-arrangement linear motor according to a first embodiment of the present invention will be described with reference to the drawings Further, it is to be noted that in the following disclosure the term "distributed arrangement linear motor" represents a linear motor in which a plurality of stators are arranged in a distributed manner.

Figure 1:
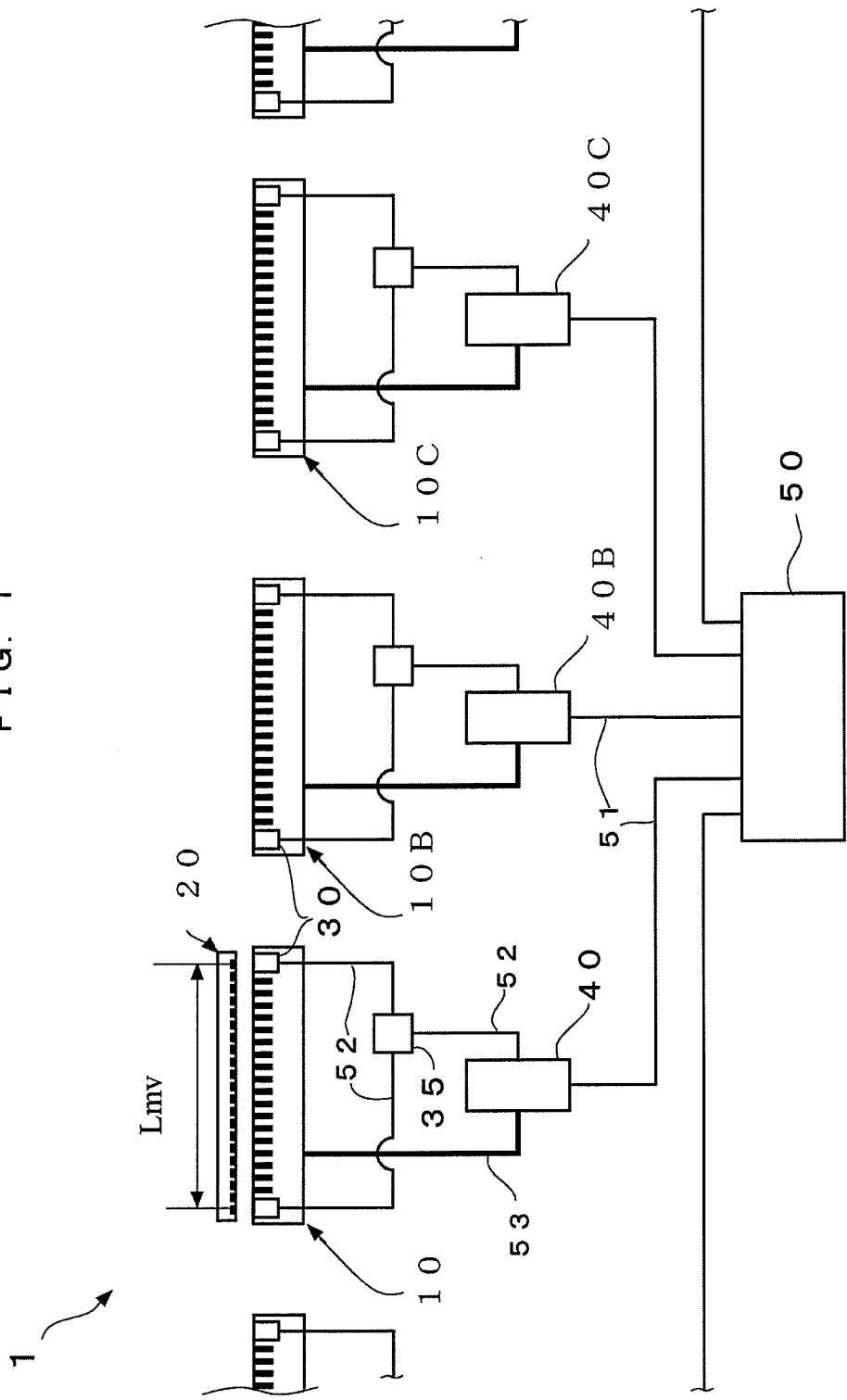
FIG. 1 is a block diagram showing one example of a schematic structure of a driving system of a distributed-arrangement linear motor according to a first embodiment of the present invention.
Figure 2:
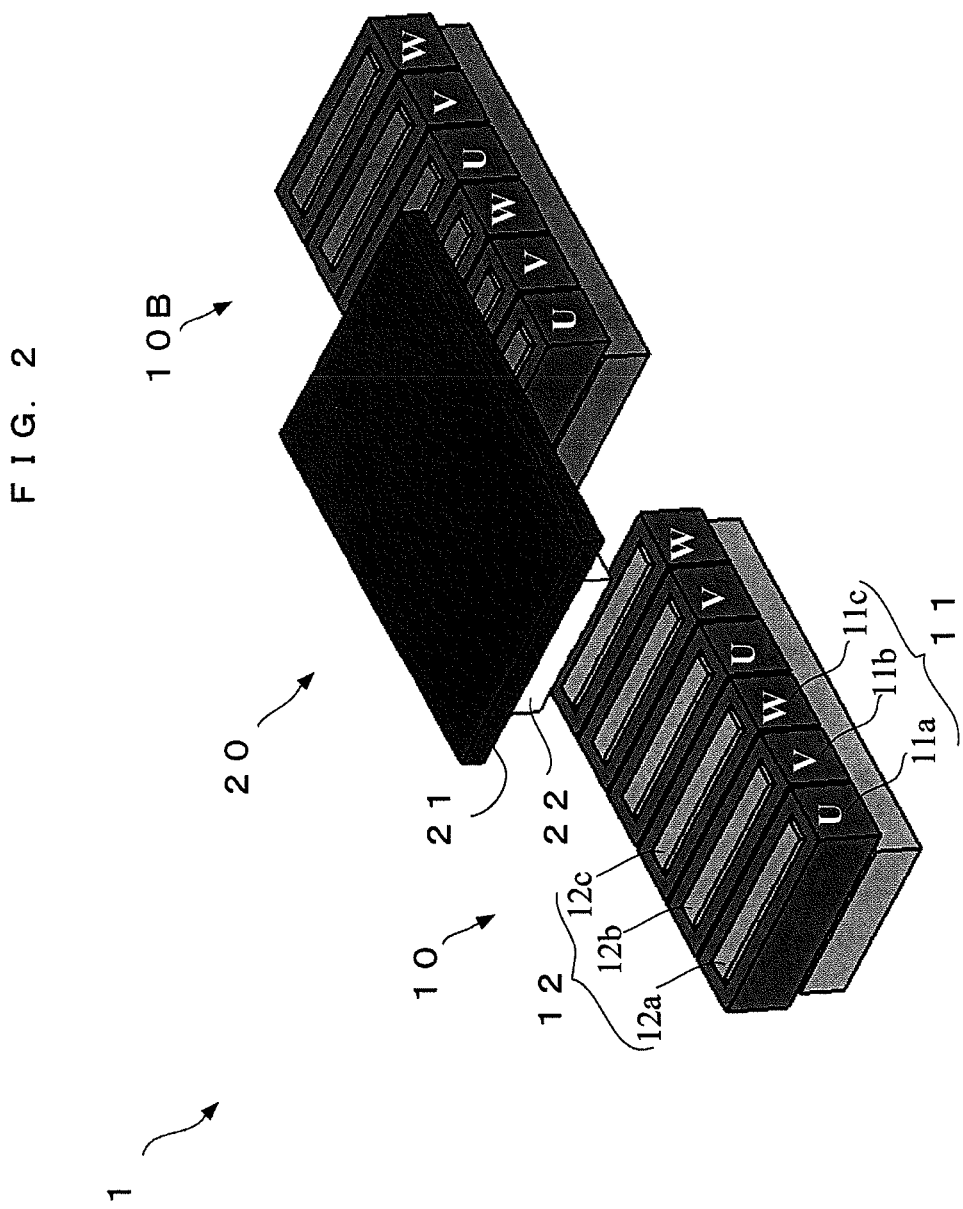
FIG. 2 is a perspective view of one example, in a pattern diagram, of a stator and a movable member of the distributed arrangement linear motor shown in FIG. 1.
Figure 3:
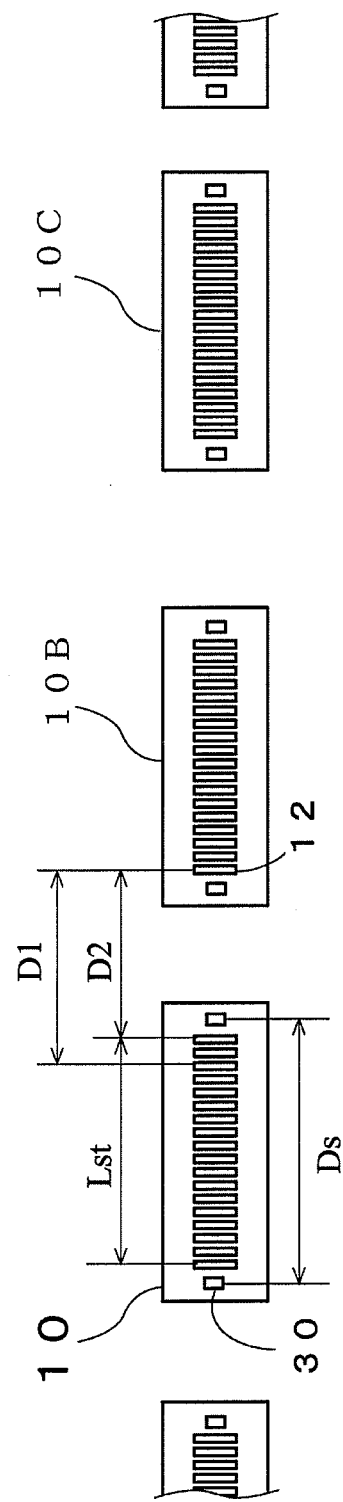
FIG. 3 is a plan view showing one example representing a distributed arrangement of the stators of FIG. 1.
Figure 4:
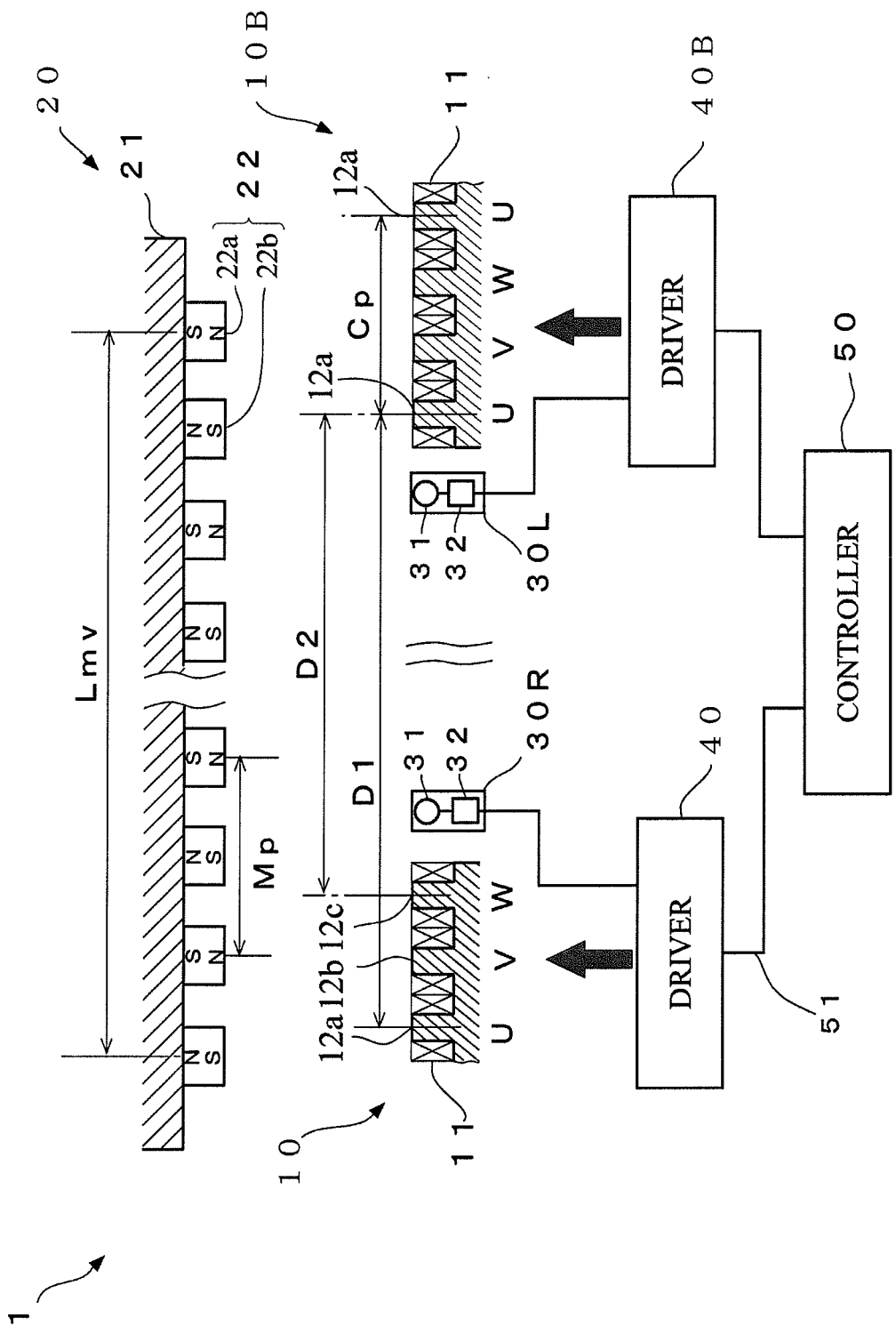
FIG. 4 is a pattern diagram showing one example of a detailed state between the stators of a drive system of the distributed-arrangement linear motor shown in FIG. 1.
Figure 5:
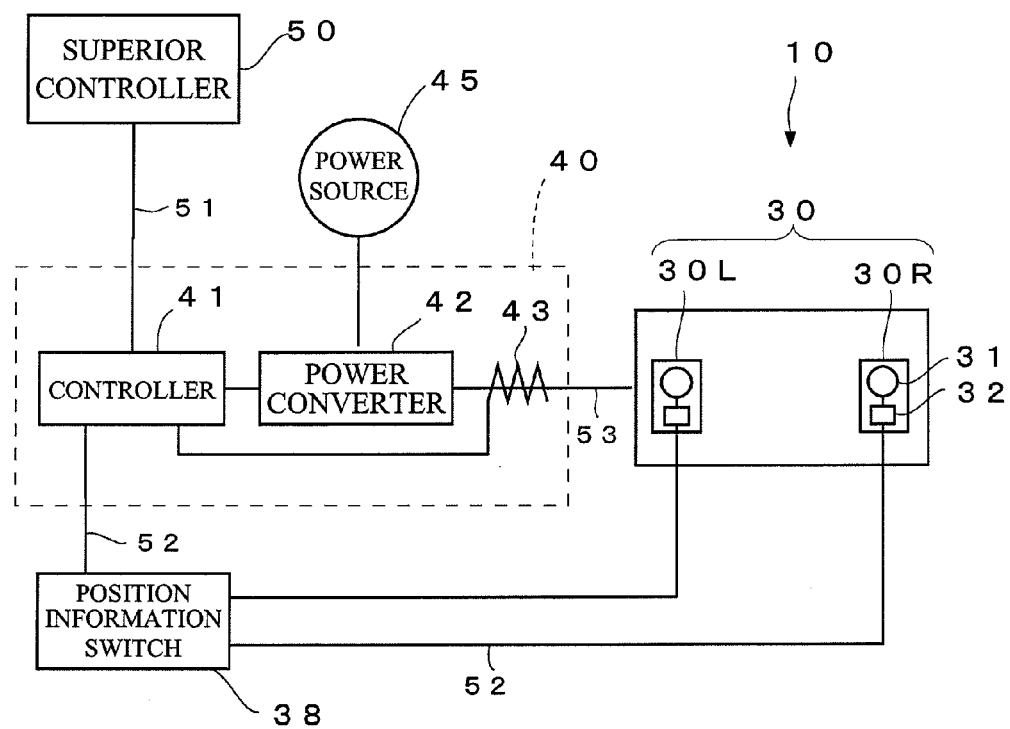
FIG. 5 is a block diagram showing one example of a structure of a motor control apparatus shown in FIG. 1.

FIG. 1 is a block diagram showing one example of a schematic structure of a drive system of a distributed arrangement linear motor according to the present embodiment of the present invention. FIG. 2 is a perspective view showing the stator and the movable member of the distributed arrangement linear motor shown in FIG. 1. FIG. 3 is a plan view showing one example representing an arrangement of the stators of FIG. 1. FIG. 4 is a pattern diagram showing the detailed state between the stators of the drive system of the distributed arrangement linear motor shown in FIG. 1. FIG. 5 is a block diagram showing one example of a structure of the motor control apparatus shown in FIG. 1.

As shown in FIG. 1, the drive system of the distributed arrangement linear motor includes a linear motor 1 (in which stators are arranged in a distributed manner), a plurality of motor drivers (motor driving devices) 40, 40B, 40C for controlling the distributed arrangement linear motor 1, and a superior (higher-level) controller 50 for controlling the plural motor drivers 40, 40B, 40C.

The distributed arrangement linear motor 1 includes stators 10, 10B, 10C relatively movable by magnetic action and a movable member 20, a plurality of position detectors (position detecting devices) 30 for detecting the relative position of the movable member 20 to the stators 10, 10B, 10C, and a position information switch (position information switching device) 35 for switching signals from the plural position detectors 30. In such distributed arrangement linear motor, a plurality of stators 10, 10B, 10C are arranged in a distributed manner in a conveying direction at a predetermined interval therebetween.

The superior controller 50 and the respective motor drivers 40 are connected each other by means of control lines 51. The motor drivers 40 and the position information switch 35 are connected each other by means of encoder cable 52. The position information switch 35 and the position detector 30 provided for the same stator (10, 10B, 10C) are also connected by means of encoder cable 52. The motor drivers 40 and the stators 10, 10B, 10C are connected, respectively, by means of power cables 53.

Further, the movable member 20 is guided along a predetermined truck by a guide device, not shown, and a gap between the movable member 20 and each of the stators 10, 10B, 10C is maintained.

As shown in FIGS. 2 and 4, each of the stators 10 and 10B includes a coil 11 (coils 11a-11c) supplied with three-phase current and magnetically acting with respect to the movable member 20 and a projecting pole 12 (poles 12a-12c) around which the coil 11 is wound up. The coil 11 includes a U-phase coil 11a, a V-phase coil 11b and a W-phase coil 11c. The projecting pole 12 includes a pole 12a for the U-phase, a pole 12b and a pole 12c corresponding to the coils 11a, 11b and 11c, respectively. These are one example of poles generated on the movable member side by passing current to the coil 11, and such pole of the stator is one example composed of the coil 11. These coils 11a, 11b, 11c and the projecting poles 12a, 12b, 12c are arranged in the direction of the relative motion (movement) of the movable member 20 periodically in the order of U-phase, V-phase and W-phase, thus constituting the periodic structure. That is, the coils 11 and the poles 12 constitute the periodic structure of U-phase, V-phase and W-phase in the longitudinal direction of the stators 10, 10B as one example in the direction of the relative motion.

Further, the core portions of the electromagnets of the stators 10, 10B, 10C including the projecting poles 12 are composed of magnetic material having less magnetic hysteresis loss such as silicone steel, and as shown in FIG. 2, the core portions form projecting poles 12 extending in the width direction of the stators 10 and 10B so as to project on a side opposing to the movable member 20, and such projecting poles 12 are arranged side by side in a comb-shape in the longitudinal direction of the stator 10 and 10B.

As shown in FIG. 3, the stators 10, 10B, 10C are arranged in the longitudinal direction of the stators 10, 10B, 10C, as one example of the direction of the relative motion, with a predetermined stator distance (distance between adjacent stators) in the described order. Herein, as one example of the stator distance, as shown in FIG. 4, there will be indicated the minimum distance D1 between the same kinds of poles of the adjacent stators 10 and 10B and the minimum distance D2 between the poles of the adjacent stators 10 and 10B.

Next, the movable member 20 is provided with, as shown in FIG. 2, a table 21 on which parts or work is rested and a permanent magnet 22 for driving mounted on the lower surface of the table 21, the movable member 20 thus acting as a carrier for the parts or work.

The permanent magnets 22 each includes an N-pole magnet 22a having an N-pole on a side opposing to the stators 10 and 10B and an S-pole magnet 22b having an S-pole, and a periodic structure, in which the N-pole magnets 22a as N-poles and the S-pole magnets 22b as S-pole are alternately arranged periodically in the direction of the relative motion between the stators 10, 10B and the movable member 20. That is, the movable member 20 has the periodical structure of the N-pole/S-pole in the longitudinal direction of the stator 10 as one example of the relative motion direction. Further, the movable member 20 has a length, for example, of Lmv being the maximum length, between poles of the movable member 20.

Movable magnetic field is caused in accordance with direction and/or strength of three-phase alternating current passing through each of the coils 11a, 11b and 11c of the stator 10, and the projecting poles 12a, 12b, 12c, and the N-pole magnet 22a and the S-pole magnet 22b act magnetically each other to thereby cause the relative motion between the stator 10 and the movable member 20 in the longitudinal direction of the stator 10. That is, the stator 10 and the movable member 20 mutually magnetically act, and the movable member 20 performs the relative motion in the longitudinal direction of the stator 10.

The position detector 30 (30L, 30R) includes, as shown in FIG. 4, a magnetic sensor 31 for detecting magnetism and a position detecting circuit 32 for converting a signal from the magnetic sensor 31 to a signal for specifying a position and detecting that position. Herein, the magnetic sensor 31 is positioned to a center portion on the side opposing to the movable member 20 in the position detector 30 disposed to the stator 10.

The position detectors 30 are arranged, as shown in FIGS. 1, 3 and so on, outside the projecting poles 12 and disposed at central portions in the width directions of the stators 10, 10B, 10C, and the position detectors 30 are set in a manner such that the magnetic sensors 31 face the side of the stators 10, 10B, 10C opposing to the movable member 20.

It may be desired that the position detectors 30 are positioned in a distributed arrangement in the longitudinal direction of the stators 10, 10B, 10C as long as being not influenced by the coils 11. Furthermore, as shown in FIG. 4, the position detector 30R of the stator 10 is arranged outside the right-end projecting pole 12c and the position detector 30L of the stator 10B is arranged outside the left-end projecting pole 12a.

The magnetic sensor 31 detects the magnetic field caused by the permanent magnet 22 extending in the relative motion direction of the stator 10 and the movable member 20. The magnetic sensor 31 detects variation of the magnetic field by the relative motion of the stator 10 and the movable member 20. Specifically, the magnetic sensor 31 is a sensor detecting the direction of the magnetic field. The distance Ds between the position detectors 30, i.e., between the magnetic sensors, is less than (not more than) the length Lmv of the movable member 20. That is, this is one example indicating that the distance between the first magnetic sensor 31 and the second magnetic sensor 31 is less than (not more than) the maximum distance between the poles of the movable member 20.

Next, the position information switch 35 generates an output to the motor driver 40 by selecting one of input signals from a plurality of position detectors 30. For example, the position information switch 35 outputs an input signal which was first input. Furthermore, in a case when an input signal is only one signal, the position information switch 35 outputs this signal as it is, and if no signal is input, no output signal is generated.

The motor driver 40 includes, as shown in FIG. 5, the controller 41 for controlling current to be flown to the stator 10 of the linear motor based on information from the sensor and so on, a power converter 42 for converting the power from the power source 45 based on the controller 41, the current censor 43 for detecting the power flowing to the stator 10 from the power converter 42, and an input unit (not shown) for inputting information concerning the distance between the stators 10B and 10C. The motor drivers 40B and 40C have also the same structures as that mentioned above with reference to the motor driver 40.

The controller 41 is connected to the superior controller 50 through the control line 51 and connected to the position information switch 35 through the encoder cable 52.

The controller 41 controls the power converter 42 such as PWN (Pulse Width Modulation) inverter so that the movable member 20 moves in surely response to command value from the superior controller 50 and finally controls the current to be supplied to the coils 11 of the stators 10, 10B, 10C. A control system of the controller 41 is composed of a position control loop performing the position control, a speed control loop performing the speed control and a current control loop performing the current control. The controller 41 functions as one example of a current control unit for controlling the current to be supplied to the coil based on the distance between the stators. Further, information concerning the distance between the stators and information concerning the current phase based on the distance between the stators are obtained from the superior controller 50.

The motor driver 40 is controlled, as shown in FIGS. 1 and 4, by the command value from the superior controller 50, and the current is supplied to the coil of the stator 10 based on the information from the position detector 30 till the movable member reaches the position based on the command value from the superior controller 50.

The superior controller 50 is provided with a CPU (Central Processing Unit), RAM (Random Access Memory) and ROM (Read Only Memory), and outputs, as command values, information concerning the position command or information concerning the speed command to the respective motor drivers 40, 40B and 40C in accordance with the working sequence set preliminarily. Further more, the superior controller 50 calculates the phases of the currents to be supplied to the coils 11 through the respective motor drivers 40, 40B, 40C on the basis of the stator distance between the stators 10, 10B and 10C, for example, as shown in FIG. 4, the minimum distance D1 between the poles of the same kinds of the adjacent stators 10 and 10B or minimum distance D2 between the poles of the adjacent stators 10 and 10B. Furthermore, when the respective motor drivers 40, 40B and 40C are controlled, the superior controller 50 outputs the information concerning the position commands or information concerning the speed command to the respective motor drivers 40, 40B and 40C. As mentioned above, the superior controller 50 calculates, as one example of current control means, the phases of the currents to be supplied to the coils based on the stator distances D1 and D2.

Incidentally, the linear motor 1 is one example of a flat type linear motor, which includes a filed magnet unit in which a plurality of permanent magnets having both ends, to which N- and S-poles are applied, perpendicular to one axial direction along which the N- and S-poles are alternately arranged, as one of the movable member and the stator, and also includes a plurality of coils opposing to the field magnet unit via a space as the other one of the movable member and the stator.

Hereunder, the relationship in the distributed arrangement of the stators 10 and 10B are explained in detail with reference to FIG. 4.

As shown in FIG. 4, with the projecting poles 12 of the stators 10 and 10B, the projecting poles 12a, 12b and 12c are arranged in this order with a length of one periodic cycle of a coil pitch Cp. The coil pitch Cp, which is one example of the length of one periodic cycle in the periodic structure of the stator 10 (10B), is the minimum distance between the projecting poles of the same phase in the U-, V-, W-phase. For example, the coil pitch Cp is the distance between the projecting pole 12a for the U-phase and the projecting pole 12a of the next U-phase. Further, in the illustration of FIG. 4, the distance is described with the center of the projecting pole 12 being the standard. Herein, measurement of the distances and the lengths of the stators 10, 10B and the movable member 20 may be performed by connecting portions of the same phase in the periodic structure regardless the kinds of the poles of the projecting pole 12 and the permanent magnet 20. That is, for example, the distance or length connecting corners of one side of the projecting pole 12 other than the center of the projecting pole 12 may be adopted.

One example of the minimum distance D1 between the poles of the same kind of the adjacent stators 10 and 10B is a distance connecting the projecting pole 12a of the U-phase positioned most on the side of the stator 10B and the projecting pole 12a of the U-phase positioned most on the side of the stator 10. As mentioned above, in the case where the distance D1 is less than the length Lmv of the movable member 20, the movable member 20 can take the position straddling the adjacent stators 10 and 10B, in which either one of the poles of the stators 10 and 10B and either one of the poles of the movable member 20 are always opposed to each other, and furthermore, the poles 12a, 12b and 12c of the U-, V- and W-phases as a set of poles of the stators 10 and 10B and either one of the poles of the movable member 20 are always opposed to each other. Such relationship between the minimum distance D1 and the length Lmv is one example in which the distance D1 between the adjacent stators 10 and 10B is less than (not more than) the length Lmv of the movable member 20.

Further, as also shown in FIG. 4, one example of the minimum distance D2 between the poles of the adjacent stators 10 and 10B is a distance connecting the projecting pole 12c of the W-phase positioned most on the side of the stator 10B and the projecting pole 12a of the U-phase positioned most on the side of the stator 10. This distance D2 is less than the length Lmv of the movable member 20. Herein, the length Lmv of the movable member 20 corresponds to a distance connecting the permanent magnets 22 disposed at both the end portions in the direction of the relative motion of the movable member 20 as shown in FIG. 4. That is, this is one example of the maximum distance between the poles of the movable member 20.

As mentioned above, in the case where the distance D2 is less than the length Lmv of the movable member 20, the movable member 20 can take the position straddling the adjacent stators 10 and 10B, in which either one of the poles of the stators 10 and 10B and either one of the poles of the movable member 20 are always opposed to each other, and such relationship between the minimum distance D2 and the length Lmv is one example in which the distance D2 between the adjacent stators 10 and 10B is less than (not more than) the length Lmv of the movable member 20.

Next, the coil 11 of the stator 10 and a phase of current to be supplied will be explained hereunder.

As shown in FIG. 4, a distance $\lambda$ being a difference between the distance D1 between the adjacent stators 10 and 10B and multiple times of natural number of the coil pitch Cp is expressed as follows.

$$\lambda = D1 - Cp \times \text{Natural Number} (\lambda < Cp) \quad (1)$$

In this case, phase difference $\psi$ between current flowing to the coil 11 of the stator 10 and current flowing to the coil 11 of the stator 10B is expressed as follows.

$$\psi = 2\pi \cdot \lambda / Cp \quad (2)$$

Supposing that wave-shape of the current passing through the coil 11 of the stator 10 is $\cos(\omega t)$, wave-shape of the current passing through the coil 11 of the stator 10B will become $\cos(\omega t + \psi)$.

Figure 8:
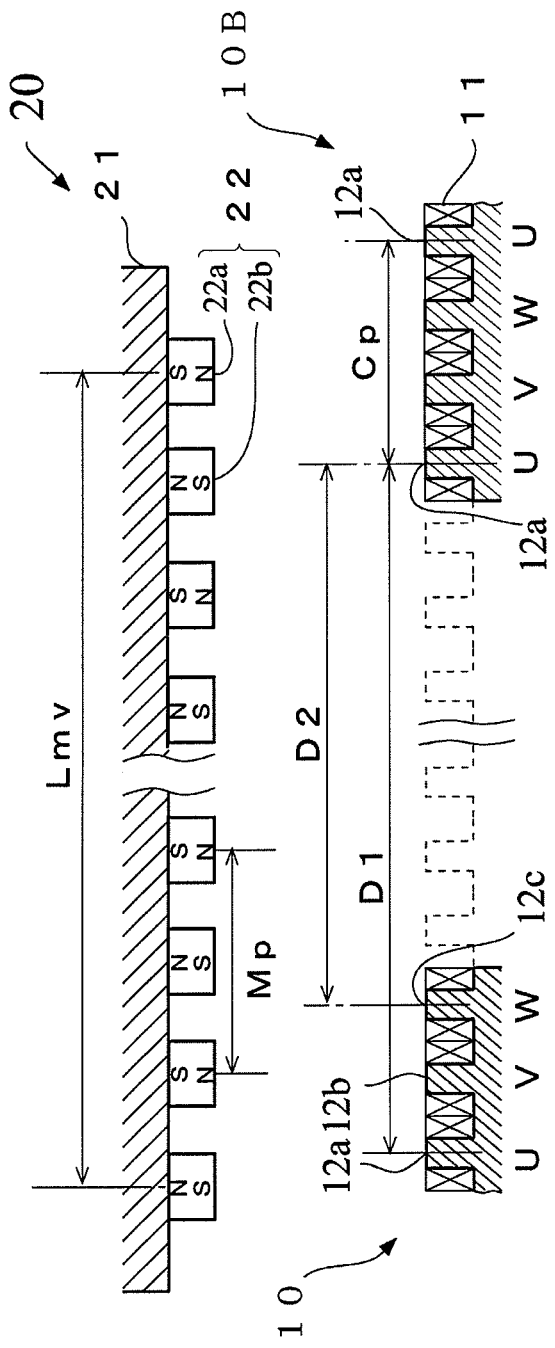
FIG. 8 is a pattern diagram showing one example of periodic structures of poles of the stator and the movable member shown in FIG. 1.

Further, in a case where the distance D2 between the adjacent stators 10 and 10B is adopted, as shown in FIG. 8, a distance between the pole 12a of the U-phase and the pole 12c of the W-phase, i.e., $2/3$ time of the coil pitch Cp, may be added to the distance D2. A relational expression between the distance D1 and the distance D2 will be expressed as follows.

$$D1 = D2 + 2/3 \cdot Cp \quad (3)$$

Further, with respect to currents of the V- and W-phases, phase difference $\phi$ is set, and the distance D1 between the adjacent stators 10 and 10B is input as a design value of a structure of a distributed-arrangement linear motor to the superior controller 50.

Hereunder, the magnetic sensor 31 constituting the position detector 30 will be explained with reference to the figures.

Figure 6:
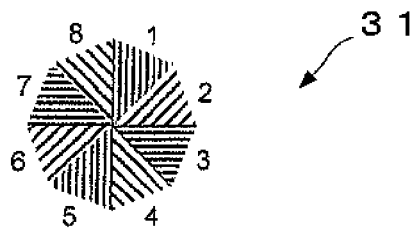
FIG. 6 is a view showing one example of a magnetic sensor shown in FIG. 5 having two-set of full bridge structure (in FIG. 6 (A) is a plan view showing a shape of a ferromagnetic thin metal of the magnetic sensor and (B) is a view showing an equivalent circuit).
Figure 6:
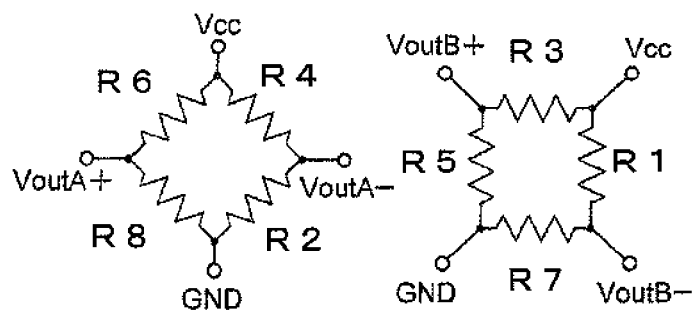

FIG. 6 is a view showing a magnetic sensor having two-set of full bridge structure constituting the position detector of FIG. 1 (in FIG. 6, (A) is a plan view showing a shape of a ferromagnetic thin metal of the magnetic sensor and (B) is a view showing an equivalent circuit).

The magnetic sensor 31 of the position detector 30 has a magneto-resistance element composed of Si or glass substrate and a ferromagnetic thin metal film of an alloy having main component of ferromagnetic metal such as Ni, Fe or like formed on the substrate. The magnetic sensor is called an AMR (Anisotropic-Magnetro-Resistance) sensor (anisotropic-magnetro-resisting element) because resistance value thereof varies in a specific field direction.

Figure 7:
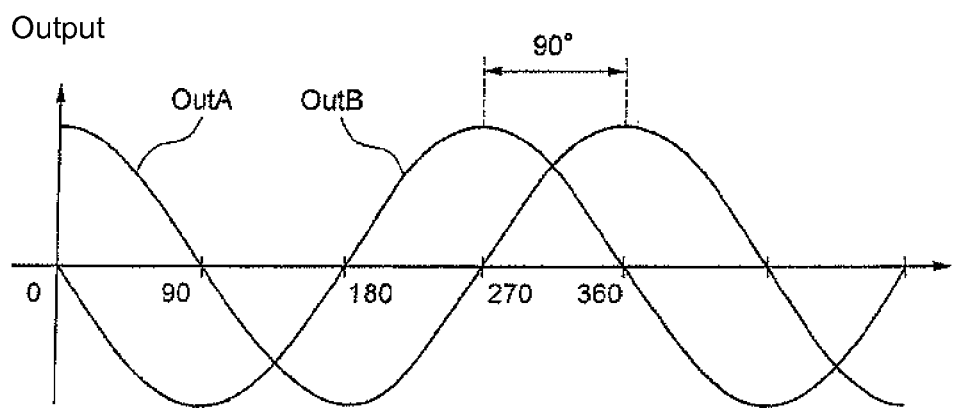
FIG. 7 is a graph showing one example of sine-wave signal and cosine-wave signal generated from the magnetic sensor shown in FIG. 5.

As shown in FIG. 6, the magnetic sensor of the position detector 30 is formed on one substrate so that elements of two sets of full bridge structure are inclined by 45 degrees from each other to acknowledge the direction of motion. Output powers VoutA and VoutB obtained by the two sets of full bridge circuits constitute cosine wave and sine wave having phase difference of 90 degrees from each other as shown in FIG. 7. Since the magnets 22a and 22b are arranged alternately in the direction of the relative motion, the output of the position detector 30 forms the cosine and sine waves. As mentioned, the position detector 30 outputs the change in the direction of the magnetic field generated periodically by the relative motion based on the periodic structure of the permanent magnet 22 for driving the movable member 20 as sine wave signal and cosine wave signal having phase difference of 90 degrees.

The output signal from the magnetic sensor is taken into the position detecting circuit 32, in which the output signal is converted into phase angle data having higher resolution by adding a digital-like interpolation processing to the sine wave signal and the cosine wave signal which have phase difference of 90 degrees.

Then, the position detector 32 produces, from this phase angle data, an A-phase encoder pulse signal (corresponding to the sine wave signal) and a B-phase encoder pulse signal (corresponding to the cosine wave signal), and generates a Z-phase pulse signal one time per one periodic cycle. The position signals of these A-phase encoder pulse signal, B-phase encoder pulse signal and Z-phase pulse signal are input into the position info information switch 35. As shown in FIG. 5, the motor driver 40 controls the power converter 42 in response to the position signals of these A-phase encoder pulse signal, the B-phase encoder pulse signal and the Z-phase pulse signal.

Next, a case in which the distance between the stators 10 and 10B is multiple times of natural number of the coil pitch Cp will be explained.

FIG. 8 is a pattern diagram showing the periodic structure of the stators 10, 10B and the movable member 20.

As shown in FIG. 8, the distance between the adjacent stators 10 and 10B is set such that the distance D1 is predetermined to a distance in multiple of the natural number of the coil pitch Cp, and the stators 10 and 10B are disposed in a distributed arrangement. In other viewpoint, it may be said that the phase of the periodic structure of the stator 10 and the phase of the periodic structure of the stator 10B accord with each other. That is, the stator 10 is arranged in such a manner that the periodic structure of the U-, V- and W-phase of the stator 10 virtually extends on the stator (10B) side as shown with broken line in FIG. 4 so that the periodic structure of the stator 10B is overlapped on this extension.

Further, the arrangement, in which the phase of the periodic structure of the stator 10 and the phase of the periodic structure of the stator 10B accord with each other, may be substituted with, in expression, such that, in one stator having a periodic structure of the coil 11 and the projecting pole 12 continuously from the stator 10 to the stator 10B, the coil 11 and the projecting pole 12 are partially eliminated in the distance D2 except the coils 11 and the projecting poles 12 at both the ends in the distance D2. Furthermore, in the case shown in FIG. 8, the distance D1 is in multiple of the natural number more than 2 times of the coil pitch Cp. Further, in an assumption that the projecting poles 12b and 12c of the V- and W-phases at the ends on the stator (10) side in the stator 10 do not exist and the projecting pole 12a of the U-phase is disposed most on the stator (10) side, the distance D1 is in multiple of the natural number more than 1 time of the coil pitch Cp.

In the case where stators 10 and 10B are arranged as mentioned above, i.e., stators 10 and 10B are arranged in such a manner as $\lambda=0$, the superior controller 50 generates command value so that a current of the same phase passes through the motor drivers 40 and 40B.

A pattern, in which the movable member 20 passes from the stator 10, through the stator 10B, to the stator 10C on which the movable member 20 stops, will be explained hereunder with reference to FIGS. 9 and 10.

Figure 9:
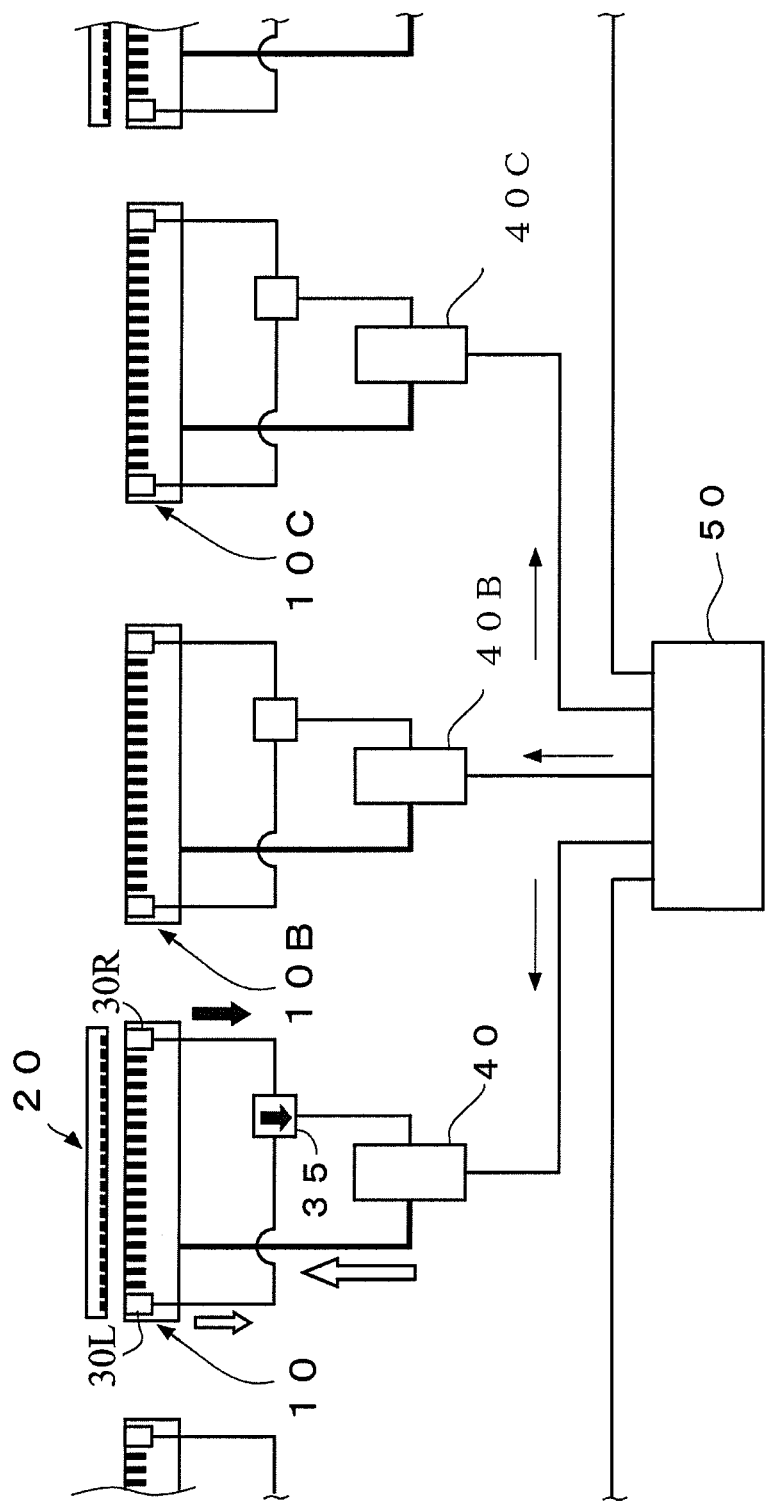
FIG. 9 is a pattern diagram representing one example of signal flow in the block diagram of FIG. 1.
Figure 10:
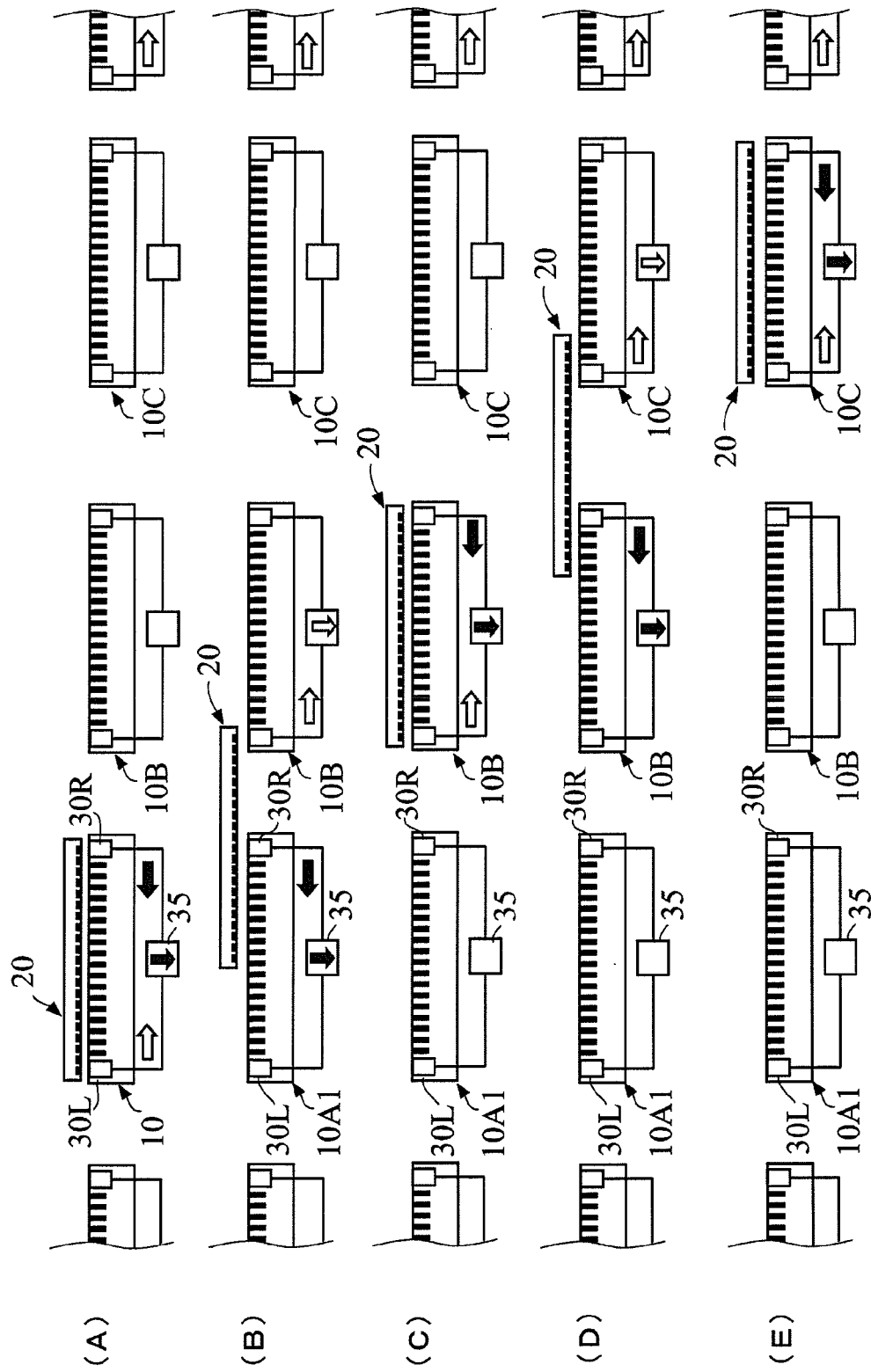
FIG. 10 includes (A) to (E) showing one example of pattern diagrams of motion of a position information switch of FIG. 1.

First, as shown in FIG. 9, the superior controller 50 outputs command value to the motor driver 40 of the stators 10, 10B, 10C. At this time, the superior controller 50 generates command values to supply a current having a phase difference $\phi$ between the coil of the stator 10 and the coil of the stator 10B based on the distance between the stators 10 and 10B and also supply a current having a phase difference $\phi$ between the coil of the stator 10 and the coil of the stator 10B based on the distance between the stators 10B and 10C. Then, based on a signal from the position information switch 35, the motor driver 40 of the stator 10 supplies the current to the stator 10.

When a state shown in FIG. 10(A) to a state shown in FIG. 10(B), the position detector 30L of the stator 10B starts to generate a signal, which is then output to the motor driver 40B by the position information switch 35. Although the movable member 20 obtains thrust forces from the stator 10 and the stator 10B, the superior controller 50 controls the motor drivers 40 and 40B so as to supply the currents with the phase difference based on the distance between the stators 10 and 10B.

Then, when the arrangement takes the state shown in FIG. 10(C), the position detector 30R of the stator 10B starts to generate a signal, to which the position information switch 35 switches an output signal. Herein, the original point on the stator 10 may take the position detector 30L in the state shown in FIG. 10(B) or the position detector 30R in the state shown in FIG. 10(C). According to such original points, although the position of the movable member 20 may be corrected on the way of the movement, the final position may be corrected on the next stator 10C.

Next, when the arrangement takes the state shown in FIG. 10(D), the position detector 30L of the stator 10C starts to generate a signal, which is then output to the motor driver 40C from the position information switch 35. Although the movable member 20 obtains thrust forces from the stator 10B and the stator 10C, the superior controller 50 controls the motor drivers 40B and 40C so that the motor drivers 40B and 40C supply the currents with the phase difference based on the distance between the stators 10B and 10C.

Thereafter, the movable member 20 reaches the position shown in FIG. 10(E) via the state shown in FIG. 10(D).

According to this embodiment, there is provided the linear motor 1 in which the stators 10, 10B, 10C and the movable member 20 are arranged to be relatively movable, and the stators and the movable member are respectively provided with plural kinds of poles (12a, 12b, 12c) and (22a, 22B, 22C) which mutually act magnetically, and with the periodic structures in which the plural kinds of poles are periodically arranged in the direction of the relative motion in the order of the kinds of the poles. Furthermore, the stators are arranged in plural numbers in the distributed manner in the relative motion direction, and the distances D1 and D2 between the adjacent stators are each less than the length Lmv of the movable member. Still furthermore, the poles of the stators are composed of coils 11 and the current control unit is disposed for controlling the current to be supplied to the coils based on the distances D1, D2 between the adjacent stators, so that when the movable member moves from one stator to the adjacent other stator, the current to be supplied to the coil is controlled by the current control unit so as not to create loss of thrust force of the movable member, and hence, control the moving speed. Thus, the present embodiment can provide the linear motor provided with suitably distributed stators in arrangement, and also provide the control method of such distributed-arrangement linear motor.

Furthermore, according to the linear motor of the described embodiment, the distance between the stators 10 and 10B is set so that the phase of the periodic structure of the stator 10 and the phase of the periodic structure of the stator 10B accord with each other, and that, even in the case when the distance D1 does not become in multiple of the natural number of the coil pitch Cp, the poles of the stator and the movable member are formed so as not to cause any thrust force loss of the movable member. Accordingly, the degree of freedom in design in the arrangement of the stators 10 and 10B can be enhanced.

Still furthermore, according to the linear motor 1 of the present embodiment, the distances D1 and D2 between the adjacent stators are set to be less than (not more than) the length Lmv of the movable member, and in the state in which the movable member straddles the adjacent stators, any thrust force from each stator does not influence, so that the movable member 20 can be smoothly moved. Specifically, in the case when the distance between the poles of the adjacent stators equals to the minimum distances D1, D2 and the length of the movable member equals to the maximum length Lmv between the poles of the movable member 20, either one of the poles of the stators 10 and 10B and either one of the poles of the movable member 20 take the state in which the poles are always opposed to each other.

Furthermore, when the superior controller 50 acts, as the current control unit, to calculate the phase of the current to be supplied to the coil 11 based on the distance D1, D2 between the stators, the current to be supplied to the coil 11 can be controlled and so as not to cause the loss in the thrust force of the movable member, and the moving speed can be also controlled.

Still furthermore, in the case when the pole of the movable member 20 is composed of the permanent magnet 22 for drive and is mounted to the stator 10 on the coil (11) side, and the position detector 30 is further provided for detecting the driving permanent magnet 22 and calculating the position, the timing in the case of changing the phase of the current passing through the coil 11 can be manipulated by the position detector 30.

Still furthermore, the permanent magnets 22 arranged to the movable member 20 are detected by the position detector 30, and in an arrangement in which two position detectors 30 are disposed so as to have a length less than the length of the movable member 20 in the direction of the relative motion, the reference positions in the respective stators 10, 10B and 10C can be determined, and in addition, any one of the position detectors 30 can always detect the movable member 20. Accordingly, it is not necessary for every one of the stators 10, 10B, 10C to provide a mark for an original point and a sensor for detecting the original point, whereby the position control can be more accurately performed with more simple structure. As mentioned above, the number of parts or members for the mark for the original point and the number of the sensor for detecting the original point can be decreased, and the labor for locating these parts can be eliminated. Furthermore, the original point can be set in accordance with the condition of the movable member 20, and correction can be done at an occurrence of an error with respect to the command value, so that the conveying system having high performance can be realized.

In addition, according to the described embodiment, since the motor drivers 40, 40B, 40C can be arranged for the stators 10, 10B, 10C, respectively, and the stators 10, 10B, 10C can be driven respectively independently, it can be possible to provide a conveying system having high degree of freedom in motion of the conveying system. Moreover, the respective moving patterns can be realized and the movable member 20 can be flexibly controlled in conformity with the working procedure.

Furthermore, based on the periodic structure of the pole of the movable member 20, the direction of the field generated by the periodic change due to the relative motion is generated as the sine wave signal and the cosine wave signal having the phase difference of 90 degrees, and the position of the movable member 20 is detected by these sine wave signal and cosine wave signal. According to such arrangement, it is not necessary to locate any linear scale which was required in a conventional structure to be provided for the movable member 20, thus simplifying the structure of the linear motor in which the stators are arranged in the distributed manner. In addition, although it was required for the linear scale to be disposed with high performance for the accurate position control, the location of such linear scale may be eliminated.

Still furthermore, the position detector 30 is installed on the stator (10) side, it is not necessary for the encoder cable 52 to be provided for the movable member 20, it is also not necessary to take around the encoder cable 52, and it can be avoided for the encoder cables 50 to become entangled. Therefore, the present embodiment is specifically available for the conveying system provided with a plurality of movable members 20. In addition, the permanent magnets 22 for driving are mounted to the movable member 20 and it is not necessary for the movable member 20 to be provided with the power cable, the completely cable-less movable member 20 can be provided, thus being particularly effective for the conveying system provided with a plurality of movable members 20.

Second Embodiment

A driving system of a distributed-arrangement linear motor according to the second embodiment of the present invention will be described hereunder.

A schematic structure of the driving system of the distributed-arrangement linear motor according to the second embodiment will be first described with reference to the accompanying drawings. It is to be further noted that portions or members corresponding to those of the first embodiment will be described by applying the same reference numerals or characters and only different structures and functions are described. Further, like expression will be applicable to other embodiments or modifications.

Figure 11:
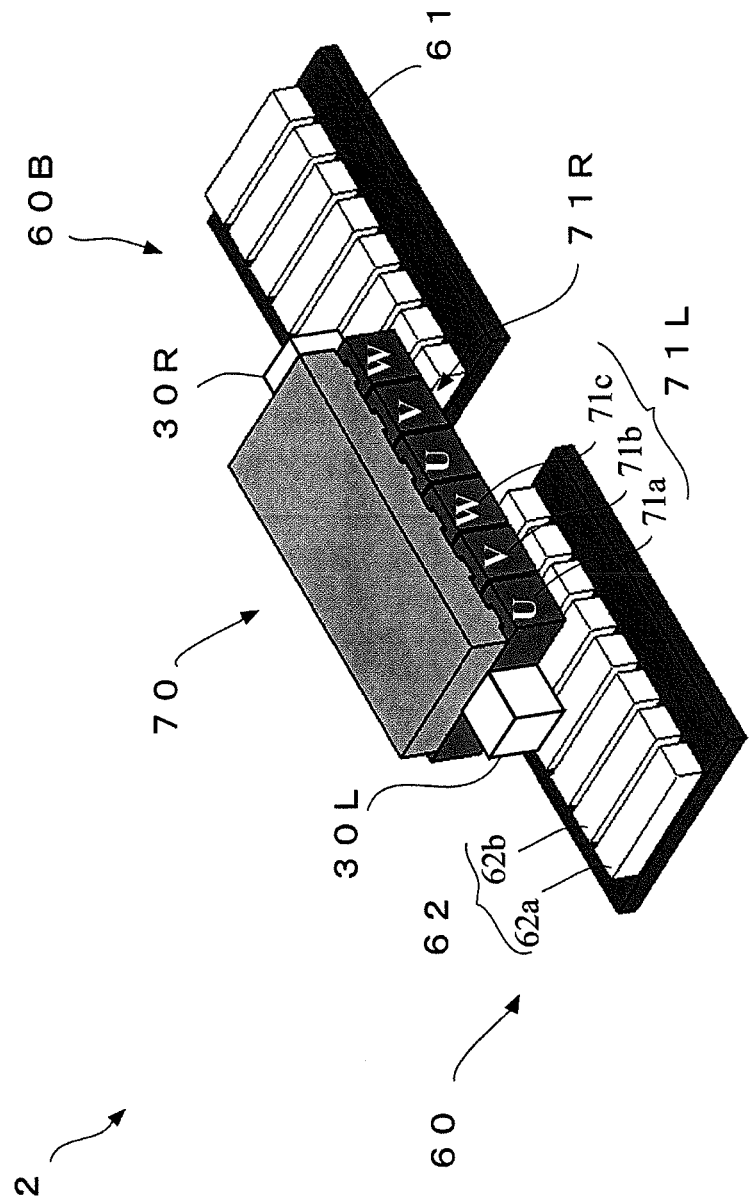
FIG. 11 is a perspective view of one example, in a pattern diagram, of a stator and a movable member of the distributed-arrangement linear motor according to a second embodiment of the present invention.
Figure 12:
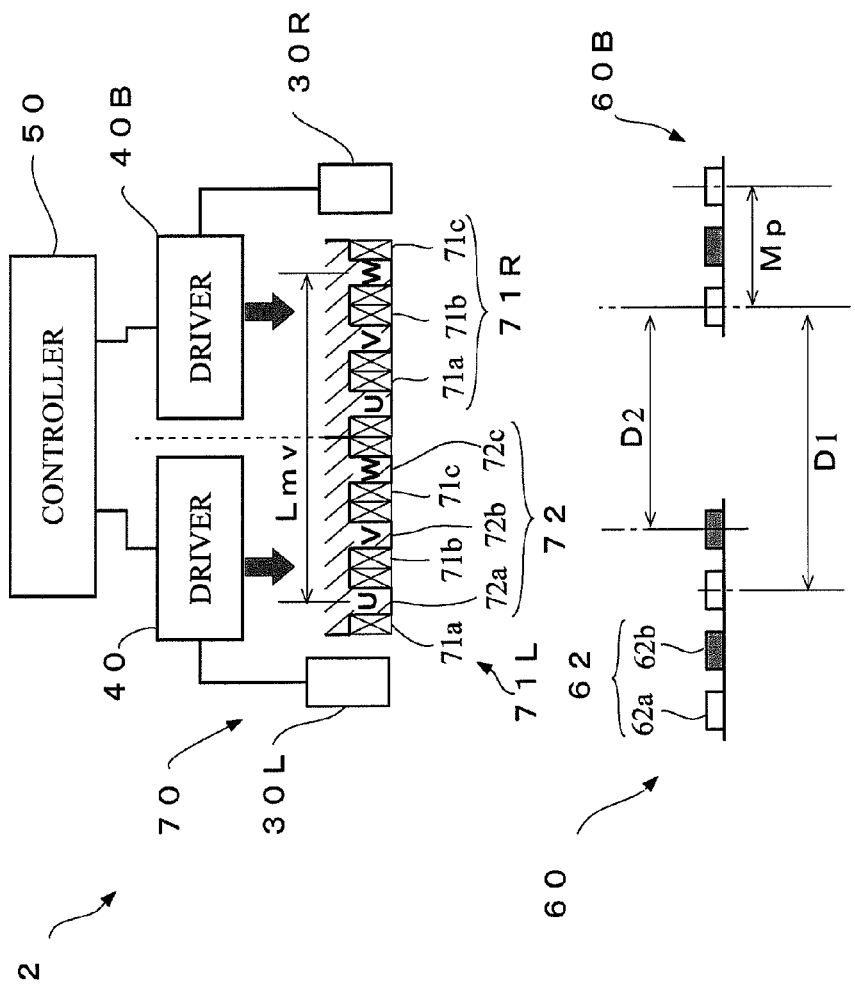
FIG. 12 is a pattern diagram showing one example of periodic structures of a pole of a stator shown in FIG. 11.

FIG. 11 is a perspective view in pattern diagram of one example of stators and movable member of a distributed-arrangement linear motor in which the stators are arranged in a distributed manner. FIG. 12 is a pattern diagram showing a periodic structure of poles of the stators shown in FIG. 11.

As shown in FIG. 11, in the second embodiment, different from the linear motor of the first embodiment, permanent magnets 22 for driving are mounted to the stators arranged in a distributed manner, and a three-phase coil and a position detector is provided for the movable member.

The drive system of the distributed-arrangement linear motor is provided, as shown in FIG. 12, with a distributed-arrangement linear motor 2 for conveying parts and works, a plurality of motor drivers 40, 40B for controlling the distributed-arrangement linear motor 2, and a superior controller 50 for controlling a plurality of motor drivers 40, 40B.

The distributed-arrangement linear motor 2 includes a plurality of stators 60, 60B and a movable member 70 which are arranged to be magnetically relatively movable to each other. In this distributed-arrangement linear motor 2, a plurality of stators 60 and 60B are arranged in a separately distributed manner with a predetermined distance in the conveying direction.

Different from the first embodiment, as shown in FIG. 12, the coils 71L and 71R of the movable member 70 are divided into the coil 71L subjected to the control of the motor driver 40 and the coil 71R subjected to the control of the motor driver 40B. That is, the coils 71L and 71R are divided into two parts areas, as a set of U-, V- and W-phase, like an area including the coil 71L opposing to the stator 60 and an area including the coil 71R opposing to the stator 60B.

Furthermore, different from the first embodiment, the movable member 70 is provided with a position detector 30 (position detectors 30L, 30R), and the movable member 70 and the motor drivers 40, 40B are connected through power cables. The position detectors 30l, 30R of the movable member 70 are connected to a position information switch (not shown) through an encoder cable, and the position information switch and the motor drivers 40, 40B are also connected through an encoder cable. The respective motor driver 40, 40B and the superior controller 50 are respectively connected through control lines.

Still furthermore, the position detectors 30L and 30R, each provided with a magnetic sensor, are arranged outside the projecting poles 72 disposed at both longitudinal end portions of the movable member 70, as shown in FIGS. 11 and 12, and the position detectors 30L and 30R are set in a manner such that the magnetic sensors of the position detectors 30L and 30R face the side of the movable member 70 opposing to the stator 60. The locating positions of the position detectors 30L and 30R are separated in the longitudinal direction of the movable member 70 so as not to suffer influence of the coils 71L and 71R.

The stators 60, 60B and the movable member 70 will be described in detail hereunder.

First, as shown in FIG. 11, each of the stators 60 and 60B includes a base 61 and permanent magnets 62 disposed on an upper surface of the base 61. The permanent magnets 62 include, as shown in FIGS. 11 and 12, N-pole magnets 62a having N-poles on the side opposing to the movable member 70 and S-pole magnets having S-poles, which magnetically function to the movable member 70. These N-pole and S-pole are one example of the poles occurring on the movable member (70) side by the permanent magnet 62. Thus, there is formed a periodic structure in which the N-pole magnets 62a and the S-pole magnets 62b are arranged periodically alternately in this order in the direction of the relative motion of the stators 60, 60B and the movable member 70. That is, each of the stators 60 and 60B has the periodic structure of the N- and S-poles in the longitudinal direction of the stator 60 as one example of the direction of the relative motion.

The movable member 70 is provided, as shown in FIGS. 11 and 12, with the coils 71L and 71R to which the three-phase alternating current is supplied and a projecting coil 72 around which the coils 71L and 71R are wound up. The coils 71L and 71R includes three-type coils of coil 71a for U-phase, coil 71b for V-phase and coil 71c for W-phase, and on the other hand, the projecting poles 72 includes three-type projecting poles of projecting pole 72a for U-phase, projecting coil 72b for V-phase and projecting coil 72c for W-phase, which correspond to the arrangement of the coils 71a, 71b and 71c, respectively. These coils 71a, 71b, 71c and poles 72a, 72b, 72c are periodically arranged in the order of the U-, V- and W-phase in the direction of the relative motion of the stators 60, 60B, 60C and the movable member 70A, thus constituting the periodic structure.

Furthermore, as shown in FIG. 12, the coils 71L and 71R are divided into two parts including the coils 71a, 71b, 71c on the position detector 30L side (left side in FIG. 12) to which the current is supplied from the motor driver 40 and the coils 71a, 71b, 71c on the position detector 30R side (right side in FIG. 12) to which the current is supplied from the motor driver 40B.

A mobile magnetic field is generated in accordance with the direction and/or strength of the three-phase alternating current passing through the respective coils 71a, 71b, 71c of the movable member 70, and the projecting poles 72 corresponding to the respective coils 71a, 71b, 71c and the N-pole and S-pole magnets 62a and 62b magnetically interact with each, which results in cause of the relative motion of the stators 60, 60B and the movable member 70 in the longitudinal direction of the stators 60, 60B. That is, the stators 60, 60B and the movable member 70 magnetically interact with each other, and the movable member 70 performs the relative motion in the longitudinal direction of the stators 60, 60B.

For example, during the relative movement of the movable member 70 on and along the stator 60, the drive motors 40, 40B supply the current of the same phase. Next, as shown in FIG. 12, the position detector 30R disposed forward in the advancing direction of the movable member 70 detects the stator 60B, and based on the information from the position detector 30R, the superior controller 50 changes the phase of the current to be supplied to the motor drivers 40, 40B.

The superior controller 50 then calculates the phase difference of the current to be supplied to the coils 71l and 71R of the motor drivers 40 and 40B based on the distance between the stators 60 and 60B, that is, based on the distances D1, D2 between the adjacent stators 60 and 60B as shown in FIG. 12. Then, when the superior controller 50 controls the respective motor drivers 40, 40B, the superior controller 50 outputs information concerning the position command or information concerning the speed command to the respective motor drivers 40 and 40B by adding the information concerning the phase difference.

As mentioned above, the superior controller 50 calculates the phase of the current to be supplied to the coils 71L, 71R as one example of the current control means. Further, the motor drivers 40, 40B function as one example of the current control unit for controlling the current to be supplied to the coils 71L, 71R based on the distances D1, D2 between the stators by obtaining the information concerning the phase difference from the superior controller 50.

Next, the relationship in arrangement of the stators 60 and 60B will be described with reference to FIG. 12.

As shown in FIG. 12, the permanent magnets 62 of the stator 60 are alternately arranged in order of the N-pole magnets 62a and the S-pole magnets 62b each with the length of one period (cycle) having magnet pitch Mp. The magnet pitch Mp as one example of the length of one period in the periodic structure of the stator 60 is the minimum distance between the same poles of the N-pole magnets 62a and the S-pole magnets 62b, and for example, is a distance between one N-pole magnet 62a and the next N-pole magnet 62a.

One example of the minimum distance D1 between the same poles of the adjacent stators 60 and 60B is a distance connecting the N-pole magnet 62a disposed on the most stator (60) side in the stator 60 and the N-pole magnet 62a disposed on the most stator (60B) side in the stator 60B. As mentioned above, in the case where the distance D1 is less than the length Lmv of the movable member 70, the movable member 70 can take a condition straddling the stators 60 and 60B, and it takes a condition that either one of the poles of the stators 60, 60B and either one of the poles of the movable member 70 are always opposed to each other. This is one example in which in the relationship between the minimum distance D1 and the length Lmv of the movable member 70, the distance D2 between the adjacent stators 60 and 60B is less than the length Lmv of the movable member 70.

Furthermore, as shown in FIG. 12, one example of the minimum distance D2 between the poles of the adjacent stators 60 and 60B is a distance connecting the S-pole magnet 62b disposed on the most stator (60) side in the stator 60 and the N-pole magnet 62a disposed on the most stator (60) side in the stator 60B. This distance D2 is less than the length Lmv of the movable member 70. Herein, as shown in FIG. 12, the length Lmv of the movable member 70 is a distance connecting the projecting poles 72 disposed both end portions in the direction of the relative motion of the movable member 70, that is, this distance is one example of the maximum distance between the poles of the movable member 20.

As mentioned above, when the distance D2 is less than the length Lmv of the movable member 70, it is possible for the movable member 70 to take a condition straddling the stators 60 and 60B, in which either one of the poles of the stator 60, 60B and either one of the poles of the movable member 70 are always opposed to each other. This is one example in which in the relationship between the minimum distance D2 and the length Lmv of the movable member 70, the distance D2 between the adjacent stators 60 and 60B is less than the length Lmv of the movable member 70.

Herein, the phase difference $\psi$ of the current to flow through the coils 71L and 71R of the movable member 70 which is divided into two areas is expressed as follows.

$$\lambda = D1 - Mp \times \text{Natural Number}(\lambda < Mp) \quad (4)$$

In this case, in FIG. 12, the phase difference $\psi$ between the current flowing to the coil 71L of the U-, V- and W-phase on the position detector (30L) side and the current flowing to the coil 71R of the U-, V- and W-phase of the position detector (30R) side is expressed as follows.

$$\psi = 2\pi \cdot \lambda / Mp \quad (5)$$

Further, in a case where the distance D2 between the adjacent stators 60 and 60B is adopted, as shown in FIG. 12, a distance between the N-pole magnet 62a and the S-pole magnet 62b, i.e., ½ time of the magnet pitch Mp, may be added to the distance D2. A relational expression between the distance D1 and the distance D2 will be expressed as follows.

$$D1 = D2 + \frac{1}{2} \cdot Mp \quad (6)$$

Furthermore, in the case where the distance between the stators 60 and 60B is set so that the distance D1 becomes in multiple of natural number of the magnet pitch Mp, and the stators 60 and 60B are arranged in the distributed manner, or in the other viewpoint, when the phase of the periodic structure of the stator 60 and the phase of the periodic structure of the stator 60B accord with each other, the motor drivers 40 and 40B may provide the same phase currents even in a case where the movable member 70 straddles both the stators 60 and 60B.

According to the present embodiment, it is possible to provide a distributed-arrangement linear motor and the control method thereof. The distributed-arrangement linear motor is the linear motor 2 in which the stators 60, 60B and the movable member 70 are relatively moved; the stators and the movable member have a plural kinds of poles (62a, 62b) (72a, 72b, 72c), which act mutually magnetically, and have the periodic structures in which the plural kinds of the poles are periodically arranged in the direction of the relative motion in the order of the kinds of the poles; the distances D1, D2 between the adjacent stators are less than (not more than) the length Lmv of the movable member; the poles of the movable member are composed of the coils 71L and 71R; and a current control unit for controlling the current to the coils based on the distances D1, D2 between the adjacent stators is disposed, and accordingly, when the movable member moves from one stator to the adjacent next stator, the current control unit controls the phase of the current to be supplied to the coil and hence control the moving speed so as not to cause loss of the thrust force of the movable member, thus being suitable for the distributed arrangement of the stators.

Still furthermore, in the structure in which the poles of the stators 60 and 60b are composed of the permanent magnets 62 for driving and the position detectors 30L and 30R for detecting the positions of the permanent magnets 62 for driving and calculating the positions thereof are further provided for the movable member 70 of the coils 71L and 71R, in the state in which the movable member 70 is disposed on the stator 60, the motor drivers 40 and 40B pass the same phase currents, but in the state in which the movable member 70 straddles the stators 60 and 60B, the position detector 30R positioned forward in the advancing direction of the movable member 70 detects the state that the movable member 70 straddles the stators 60 and 60B, for example, to thereby calculate the timing for changing the phase of the current to be supplied from the motor drivers 40 and 40B.

Further, in the first and second embodiments, there may be further provided calculating unit for calculating the distance between the stators for calculating the distances D1, D2 between the stators based on the information from the position detector 30 without measuring the distance between the stators. For example, based on the information from the position detector 30, the superior controller 50 calculates the speed of the movable member 20 (70) and the time at which the advancing leading end of the movable member 20 (70) passes a portion between the stators, and then calculates the distance between the stators by the speed and the passing time of the movable member 20 (70).

Furthermore, the motor driver 40 (40B, 40C) may calculate the phase and the distance between the stators in place of the superior controller 50. In this case, the motor driver 40 (40B, 40C) may include a CPU for calculating the distance between the stators and also calculating the phase of the current to be supplied to the coil in accordance with the calculated distance between the stators.

It is further to be noted that the present invention is not limited to the embodiments described above, and the described embodiments are modes or examples for embodying the invention, and every one, which has a structure substantially the same as the technical idea recited in the scope of the appended claim of the present invention and attains functions and effects identical to those obtainable by the present invention, is included in the technical scope of the present invention.

1, 2 - - - distributed-arrangement linear motor (in which stators are arranged in a distributed manner); 10, 10B, 10C, 60, 60B - - - stator; 11, 71L, 71R - - - coil; 20, 70 - - - movable member; 22, 62 - - - permanent magnet; 30, 30L, 30R - - - position detector; 40, 40B, 40C - - - motor controller; 50 - - - superior controller

The invention claimed is:

1. A distributed-arrangement linear motor in which a stator and a movable member are arranged to be relatively movable, and a plurality of stators are arranged separately in a direction of the relative motion, wherein
   the stator and the movable member respectively have periodic structures in which plural kinds of poles of the stator and the movable member which magnetically act each other and arranged periodically subsequently in an order according to the arrangement in a direction of the relative motion therebetween;
   a distance between adjacent stators is not more than a length of the movable member in the direction of the relative motion;
   the pole of the stator or the pole of the movable member is formed of a coil;
   a current control unit that controls current to be supplied to the coil based on the distance between the stators, wherein the current control unit is configured to calculate a phase of the current to be supplied to the coil based on the distance between the stators, is further provided; and
   either one of the poles of the stator and the movable member is composed of a permanent magnet for driving a position detector, which detects a position of the permanent magnet for driving and calculates a position thereof, is provided for the stator or movable member on the coil side, and a position information switch for switching signals from a plurality of position detectors, wherein the current control unit controls current to be supplied to the coil based on the signal from the position information switch and the distance between the stators.

2. The distributed-arrangement linear motor according to claim 1, wherein the distance between the stators is a minimum distance between the poles of the adjacent stators in the direction of the relative motion, and the length of the movable member is a maximum distance between the poles of the movable member in the direction of the relative motion.

3. The distributed-arrangement linear motor according to claim 1, wherein a distance calculating unit that calculates the distance between the stators based on information from the position detector is further provided.

4. A method of controlling a distributed-arrangement linear motor including a stator and a movable member arranged relatively movable, and a plurality of stators are arranged separately in a direction of the relative motion, in which the stator and the movable member respectively have periodic structures in which plural kinds of poles of the stator and the movable member which magnetically act each other and arranged periodically subsequently in an order according to the arrangement in a direction of the relative motion therebetween, a distance between adjacent stators is not more than the length of the movable member in the direction of the relative motion, and the pole of the stator or the pole of the movable member is formed of a coil,
   wherein a current to be supplied to the coil is controlled based on the distance between the stators, wherein the current control unit is configured to calculate a phase of the current to be supplied to the coil based on the distance between the stators, and
   wherein either one of the poles of the stator and the movable member is composed of a permanent magnet for driving a position detector, which detects a position of the permanent magnet for driving and calculates a position thereof, is provided for the stator or movable member on the coil side, and a position information switch for switching signals from a plurality of position detectors, wherein the current to be supplied to the coil is controlled based on the signal from the position information switch and the distance between the stators.

* * * * *